US009619115B2

(12) United States Patent
Kim et al.

(10) Patent No.: US 9,619,115 B2
(45) Date of Patent: Apr. 11, 2017

(54) VISUALIZATION OF MULTIPLE OBJECTS ON A DASHBOARD

(71) Applicant: Tableau Software Inc., Seattle, WA (US)

(72) Inventors: Jun Kim, Sammamish, WA (US); Iain Heath, Redmond, WA (US); David Pace, Seattle, WA (US)

(73) Assignee: TABLEAU SOFTWARE INC., Seattle, WA (US)

( * ) Notice: Subject to any disclaimer, the term of this patent is extended or adjusted under 35 U.S.C. 154(b) by 265 days.

(21) Appl. No.: 13/840,848

(22) Filed: Mar. 15, 2013

(65) Prior Publication Data

US 2014/0282147 A1    Sep. 18, 2014

(51) Int. Cl.
| | |
|---|---|
| G06F 3/048 | (2013.01) |
| G06T 11/60 | (2006.01) |
| G06T 11/20 | (2006.01) |
| G06F 3/0484 | (2013.01) |

(52) U.S. Cl.
CPC ........ G06F 3/0484 (2013.01); G06F 3/04847 (2013.01)

(58) Field of Classification Search
None
See application file for complete search history.

(56) References Cited

U.S. PATENT DOCUMENTS

| | | | | |
|---|---|---|---|---|
| 4,674,043 | A * | 6/1987 | Hernandez et al. | 715/209 |
| 5,917,483 | A * | 6/1999 | Duncan | G06F 3/0481 |
| | | | | 715/788 |
| 6,166,736 | A * | 12/2000 | Hugh | 715/798 |
| 6,765,592 | B1 * | 7/2004 | Pletcher et al. | 715/760 |
| 7,752,566 | B1 * | 7/2010 | Nelson | 715/769 |
| 8,321,781 | B2 * | 11/2012 | Tolle | 715/227 |
| 2012/0005607 | A1 * | 1/2012 | Tofinetti et al. | 715/769 |

* cited by examiner

*Primary Examiner* — Jeffrey A Gaffin
*Assistant Examiner* — Nhat-Huy T Nguyen
(74) *Attorney, Agent, or Firm* — Morgan, Lewis & Bockius LLP

(57) ABSTRACT

A computer-implemented method of visualizing a dataset is implemented on a computer having memory, one or more processors, and a display. The method includes: rendering multiple objects on the display in a tiled manner, wherein each object is a visualization of a respective set of fields of the dataset and there is no overlap between the objects; in response to detecting a first user instruction, switching the rendition of at least one of the objects from the tiled manner to a floating manner; in response to detecting a second user instruction, moving a first object to a location on top of a second object, wherein the location is determined by the second user instruction such that at least a portion of the second object is covered by the first object; and in response to detecting a third user instruction, updating both the first object and the second object.

9 Claims, 16 Drawing Sheets

VISUALIZATION OF MULTIPLE OBJECTS ON A DASHBOARD

TECHNICAL FIELD

The disclosed implementations relate generally to data mining, and in particular, to systems and methods for visualizing multiple objects on a dashboard using different display manners.

BACKGROUND

In computer software, a dashboard typically refers to a user interface that includes different types of information, which may be graphics-based, text-based, or a mixture of both. The dashboard provides an overview of information, which is helpful for a user to get a quick, holistic understanding of the situation and then make decisions accordingly. In order to organize the different types of information effectively, the dashboard is often divided into multiple zones, each zone designated for a particular type of information. There is no overlap between different zones to prevent information within one zone from being covered by a different zone. However, this approach may result in a less efficient use of the space on the dashboard if a particular zone has a lot of empty space not occupied by any information.

SUMMARY

In accordance with some implementations described below, a computer-implemented method of visualizing a dataset is implemented on a computer having memory, one or more processors, and a display. The method includes: rendering multiple objects on the display in a tiled manner, wherein each object is a visualization of a respective set of fields of the dataset and there is no overlap between the objects; in response to detecting a first user instruction, switching the rendition of at least one of the objects from the tiled manner to a floating manner; in response to detecting a second user instruction, moving a first object to a location on top of a second object, wherein the location is determined by the second user instruction such that at least a portion of the second object is covered by the first object; and in response to detecting a third user instruction, updating both the first object and the second object. In response to detecting the second user instruction, the computer adjusts a size of at least one of the objects currently displayed in the tiled manner to occupy an area previously occupied by the first object before the second user instruction.

In some implementations, in response to detecting a fourth user instruction, the computer switches the rendition of at least one of the objects from the floating manner to the tiled manner, adjusts a size of at least one of the objects currently displayed in the tiled manner that occupies an area previously occupied by the first object before the second user instruction, and renders the at least one of the objects on the display in the tiled manner such that there is no overlap between the objects. In response to detecting the fourth user instruction, the first object is moved back to the area previously occupied by the first object before the second user instruction. In response to detecting the fourth user instruction, the first object is moved to an area that is not the same as the area previously occupied by the first object before the second user instruction.

In some implementations, each object on the display has a display manner attribute selected from the group consisting of tiled manner and floating manner, both the first object and the second object have a display manner attribute of tiled manner before the first user instruction. In response to the first user instruction, the display manner attribute of the first object is changed from tiled manner to floating manner while the display manner attribute of the second object remains to be tiled manner.

In some implementations, the first object has a first visual shape before the second user instruction and a second visual shape after the first object is moved to the location on top of the second object. The first object in the first visual shape is larger than the first object in the second visual shape. The first object in the first visual shape includes a list of data samples and a scroll bar and the first object in the second visual shape is a dropdown list of the data samples.

In some implementations, in response to detecting a fifth user instruction, the computer generates a third object, wherein the third object is to be displayed in the tiled manner, adjusts a size of at least one of the objects currently displayed in the tiled manner to leave an empty area on the display, and displays the third object in the empty area such that there is no overlap between the third object and the object whose size has been adjusted. There is overlap between the first object and the third object. In response to detecting a sixth user instruction, the computer moves the third object from a first location to a second location on the display and adjusts a size of at least one of the objects currently displayed in the tiled manner to accommodate the movement of the third object from the first location to the second location such that there is no overlap between the third object and any other object currently displayed in the tiled manner.

In some implementations, in response to detecting a seventh user instruction, the computer generates a fourth object and displays the fourth object on the display in the floating manner without adjusting a size of any existing object on the display.

In accordance with some implementations described below, a computer system for visualizing a dataset includes one or more processors; a display; and memory storing one or more programs. The one or more programs are configured to, when executed by the one or more processors, cause the one or more processors to: render multiple objects on the display in a tiled manner, wherein each object is a visualization of a respective set of fields of the dataset and there is no overlap between the objects; in response to detecting a first user instruction, switch the rendition of at least one of the objects from the tiled manner to a floating manner; in response to detecting a second user instruction, move a first object to a location on top of a second object, wherein the location is determined by the second user instruction such that at least a portion of the second object is covered by the first object; and in response to detecting a third user instruction, update both the first object and the second object.

In accordance with some implementations described below, a non-transitory computer readable storage medium stores one or more programs configured for execution by a computer system that includes one or more processors, a display, and memory storing one or more programs. The one or more programs includes instructions for: rendering multiple objects on the display in a tiled manner, wherein each object is a visualization of a respective set of fields of the dataset and there is no overlap between the objects; in response to detecting a first user instruction, switching the rendition of at least one of the objects from the tiled manner to a floating manner; in response to detecting a second user instruction, moving a first object to a location on top of a second object, wherein the location is determined by the second user instruction such that at least a portion of the second object is covered by the first object; and in response to detecting a third user instruction, updating both the first object and the second object. In response to detecting the second user instruction, the computer adjusts a size of at least one of the objects currently displayed in the tiled manner to occupy an area previously occupied by the first object before the second user instruction.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

The present invention provides methods, computer program products, and computer systems for visualizing a dataset or a subset thereof. In a typical implementation, the present invention builds and displays a view of the dataset based on a user specification of the view. A more detailed description of the data visualization process can be found in U.S. Pat. No. 7,089,266, which is incorporated by reference in its entirety. As one skilled in the art will realize, the dataset can be a relational database, a multi-dimensional database, a semantic abstraction of a relational database, or an aggregated or unaggregated subset of a relational database, multi-dimensional database, or semantic abstraction. Fields are categorizations of data in a dataset. A tuple is an entry of data (such as a record) in the dataset, specified by properties from fields in the dataset. A search query across the dataset returns one or more tuples.

A view is a visual representation of a dataset or a transformation of that dataset. Text tables, bar charts, line graphs, and scatter plots are all examples of types of views. Views contain marks that represent one or more tuples of a dataset. In other words, marks are visual representations of tuples in a view. A mark is typically associated with a type of graphical display. Some examples of views and their associated marks are as follows:

| View Type    | Associated Mark |
|--------------|-----------------|
| Table        | Text            |
| Scatter Plot | Shape           |
| Bar Chart    | Bar             |
| Gantt Plot   | Bar             |
| Line Graph   | Line Segment    |
| Circle Graph | Circle          |

Figure 1:
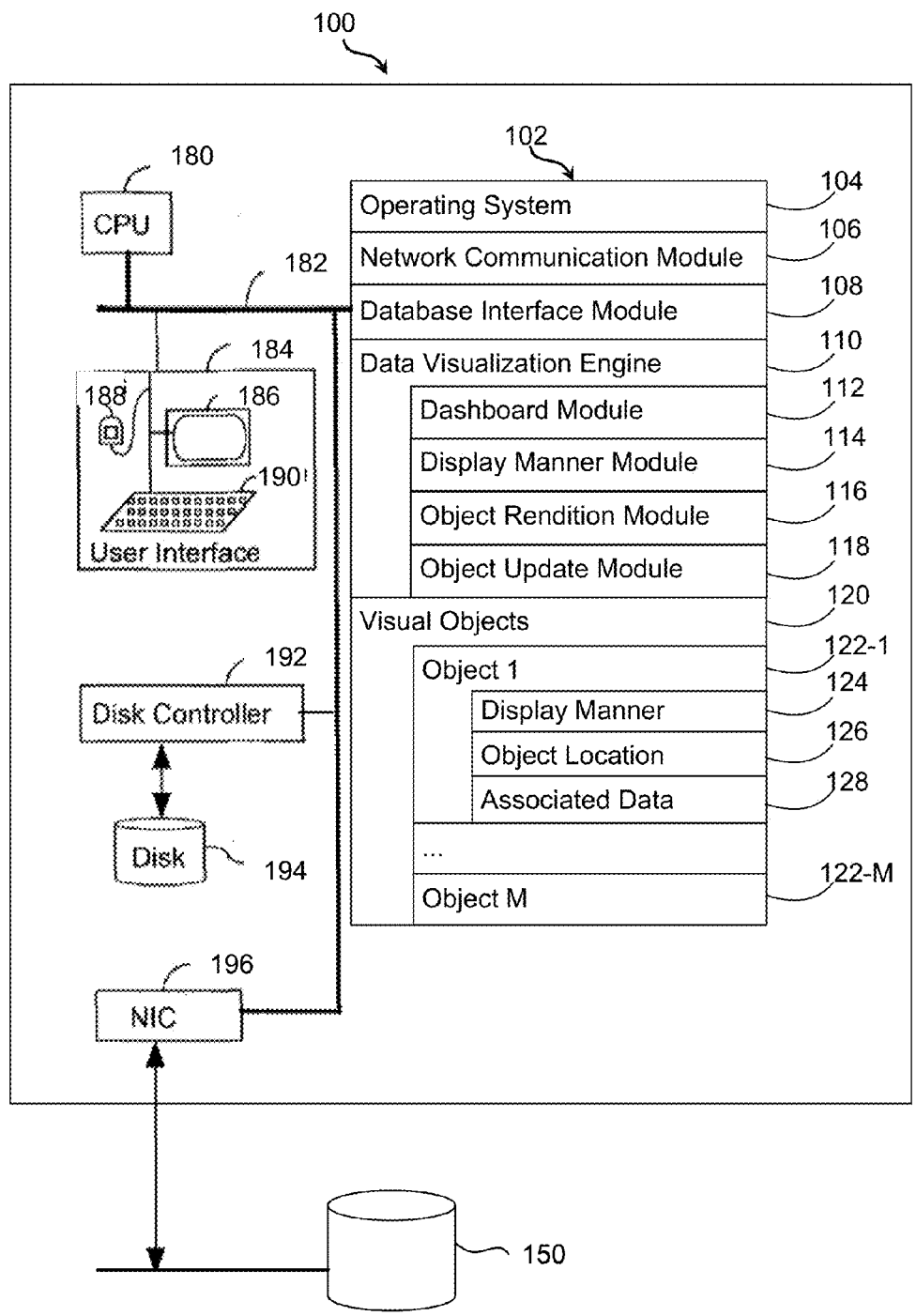
FIG. 1 is a block diagram illustrating a computer system that facilitates the visualization of a dataset in accordance with some implementations of the present invention.

FIG. 1 is a block diagram illustrating a computer system that facilitates the visualization of a dataset in accordance with some implementations of the present invention. The computer system 100 includes one or more processing units (CPU's) 180 for executing modules, programs, and/or instructions stored in memory 102 and thereby performing processing operations; memory 102; user interface 184; storage unit 194; disk controller 192; and one or more communication buses 182 for interconnecting these components. In some implementations, the user interface 184 comprises a display device 186 and one or more input devices (e.g., keyboard 190 or mouse 188). The computer system 100 may also have a network interface card (NIC) 196 to enable communication with other systems on a different network (e.g., the Internet).

In some implementations, the memory 102 includes high-speed random access memory, such as DRAM, SRAM, DDR RAM or other random access solid state memory devices. In some implementations, the memory 102 includes non-volatile memory, such as one or more magnetic disk storage devices, optical disk storage devices, flash memory devices, or other non-volatile solid state storage devices. In some implementations, the memory 102 includes one or more storage devices remotely located from the computer system 100. Memory 102, or alternately the non-volatile memory device(s) within the memory 102, comprises a non-transitory computer readable storage medium. In some implementations, memory 102 or the computer readable storage medium of memory 102 stores the following elements, or a subset of these elements, and may also include additional elements:

- an operating system 104 that includes procedures for handling various basic system services and for performing hardware dependent tasks;
- a network communications module 106 that is used for connecting the computer system 100 to other devices via the NIC 196 and one or more communication networks (wired or wireless), such as the Internet, other wide area networks, local area networks, metropolitan area networks, and so on;
- a database interface module 108 that is used for interacting with a local or remote database 150 through the NIC 196;
- a data visualization engine 110 that is used for visualizing a dataset or a subset thereof stored in the database 150, the data visualization engine 110 further comprising: a dashboard module 112 for generating and/or updating a dashboard including objects associated with the dataset or a subset thereof, a display manner module 114 for generating and/or updating the display manner of an object, an object rendition module 116 for rendering an object on the dashboard, and an object update module 118 for updating an object on the dashboard based on user instructions; and
- a plurality of visual objects 120 on the dashboard, each visual object (122-1, . . . , 122-M) having a display manner 124 (e.g., tiled or floating), an object location 126, and data 128 associated with the object.

Although dashboards have proved to be useful in many software applications, a problem with the conventional layout design of dashboards is that there may be wasted space on the dashboard if it is not allowed to have two different zones overlapping each other. In the present application, a new approach of configuring the layout of a dashboard is proposed. According to this new approach, a user starts with a default dashboard design that does not have overlaps between different zones. But the user can then customize the dashboard design by moving one zone from its current location to a new location such that it might be at least partially on top of another zone to satisfy the user's need. Moreover, the user can save the customized dashboard design on a computer for future use so that the user does not have to re-do the customization.

Figure 4A:
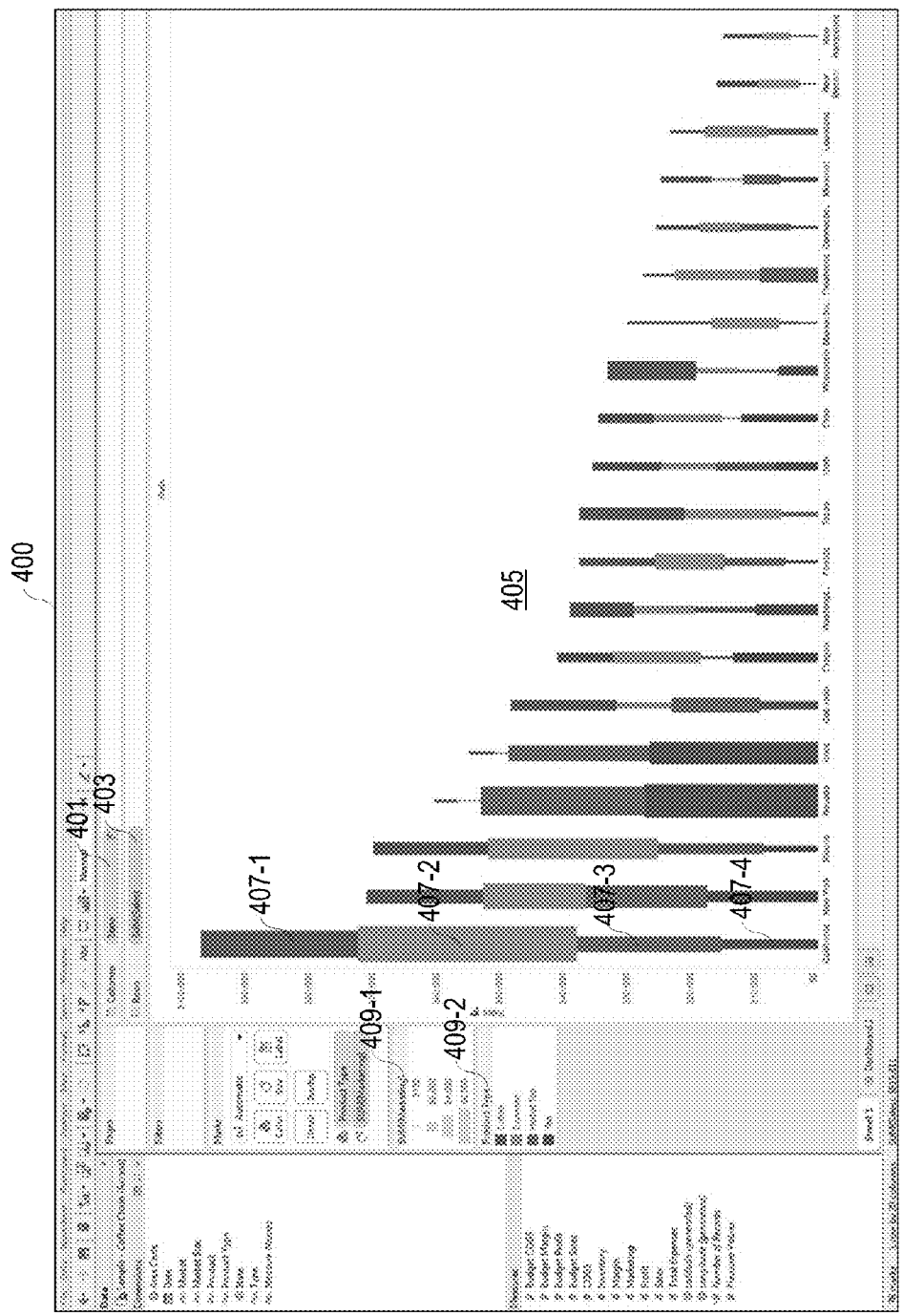
FIGS. 4A to 4J are exemplary screenshots of visualizing a dataset on a dashboard according to some implementations of the present application.

FIG. 4A is an exemplary screenshot of a data view 400 of a dataset, which is generated using data visualization software. In this example, the dataset is a collection of a coffee maker's business activities, e.g., the company's sales, profits, marketing expenses of selling different types of products in different states during a certain time period. Using the data visualization software, a sales or marketing analyst of the company can analyze the dataset to identify potential problems facing the company and develop solutions to grow the company's business. The top portion of the data view 400 includes two shelves, a Columns shelf including a "State" field 401 of the dataset and a Rows shelf including a "SUM(Sales)" field 403 of the dataset. A bar chart 405 is generated for the two fields. Each bar in the bar chart 405 corresponds to a particular state and the height of the bar represents the sum of sales of different products in the state within a predefined time period. For example, the leftmost bar in the bar chart 405 corresponds to California and the bar is further divided into four segments (407-1 to 407-4), each segment having a respective color corresponding to one of four product types 409-2 and a respective width representing the marketing expense 409-1 spent on promoting this product type in the state. After generating the data view 400, the user can move the data view to the dashboard of the software application.

Figure 2:
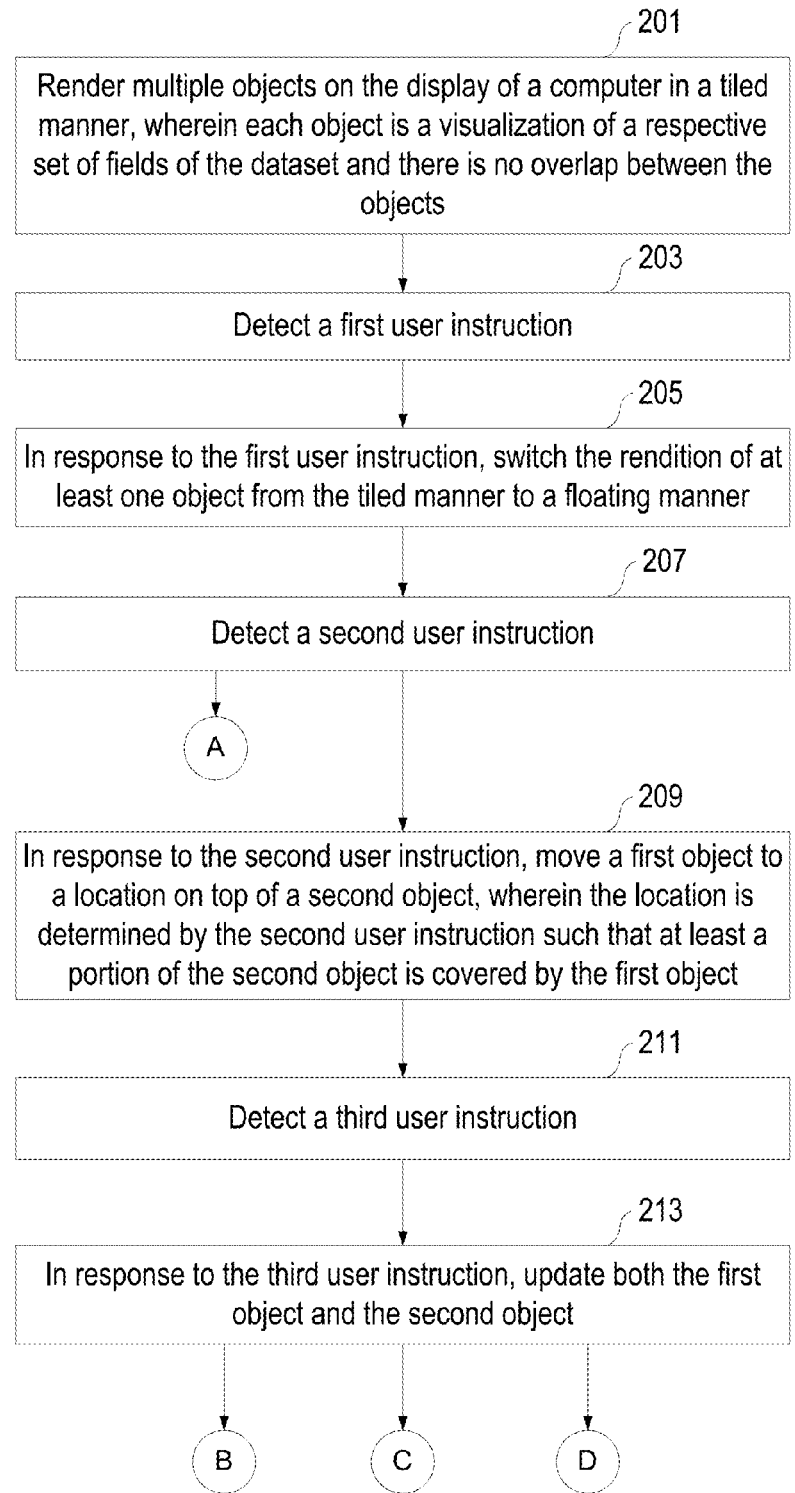
FIG. 2 is a flow chart illustrating a process of moving objects on a dashboard and adjusting their display manners through user interactions with a graphical user interface according to some implementations of the present application.
Figure 4B:
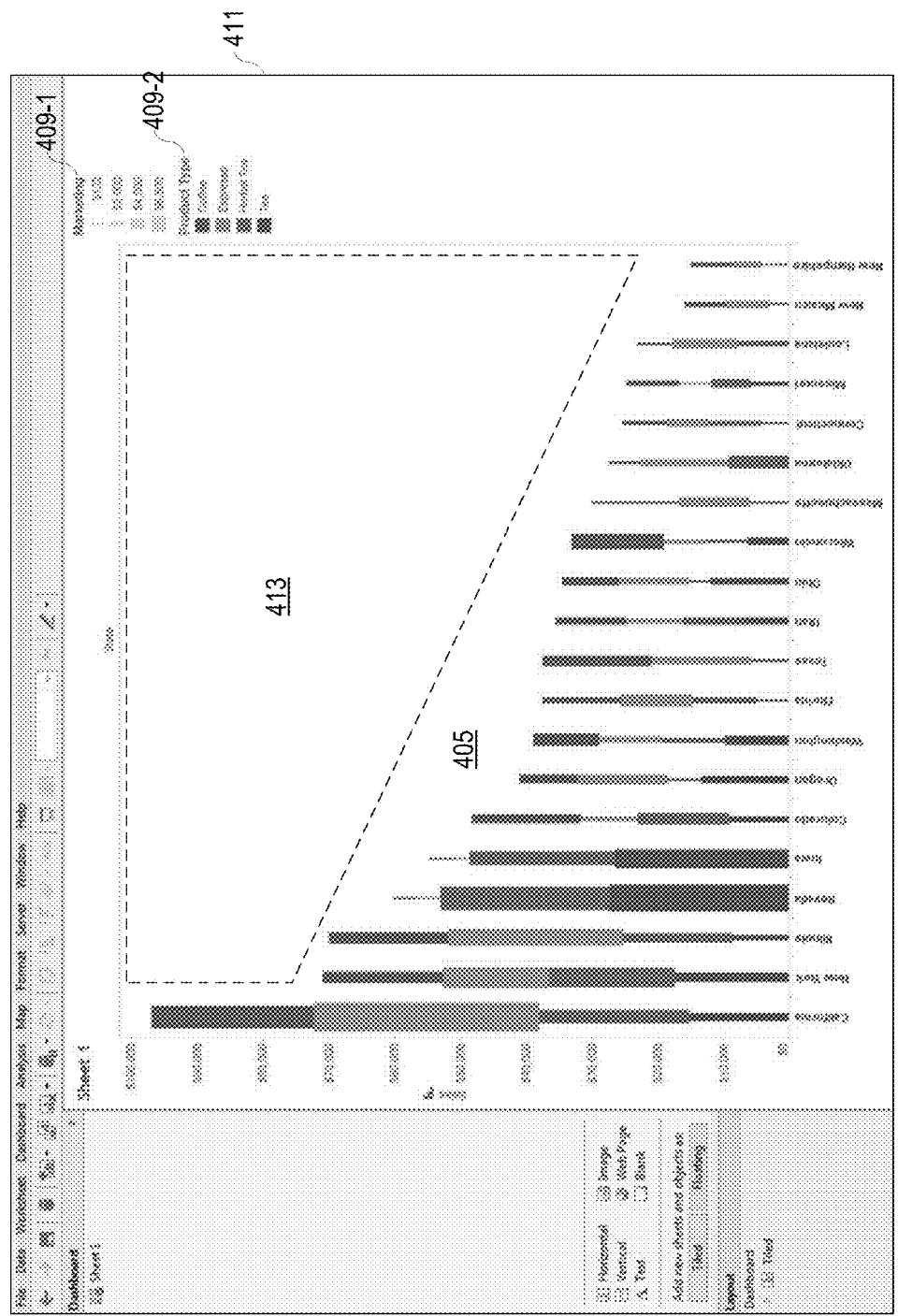

FIG. 2 is a flow chart illustrating a process of moving objects on a dashboard and adjusting their display manners through user interactions with a graphical user interface according to some implementations of the present application. The computer renders (201) multiple objects on the display of a computer in a tiled manner such that there is no overlap between the objects. Note that an object on the dashboard corresponds to a visualization of a respective set of fields of the dataset. FIG. 4B is an exemplary screenshot of a dashboard 411 including most of the data view shown in FIG. 4A. For illustrative purposes, the dashboard 411 includes only a few objects. For example, the dashboard 411 includes the bar chart 405 representing the sales figures at different states as well as the marketing expense labels 409-1 and the product type labels 409-2. But the Columns and Rows shelves are not part of the dashboard because the user is not supposed to alter the bar chart directly through the dashboard. Whenever the user visits the dashboard, he or she can tell the most recent sales figures at different states from the bar chart 405.

Figure 4C:
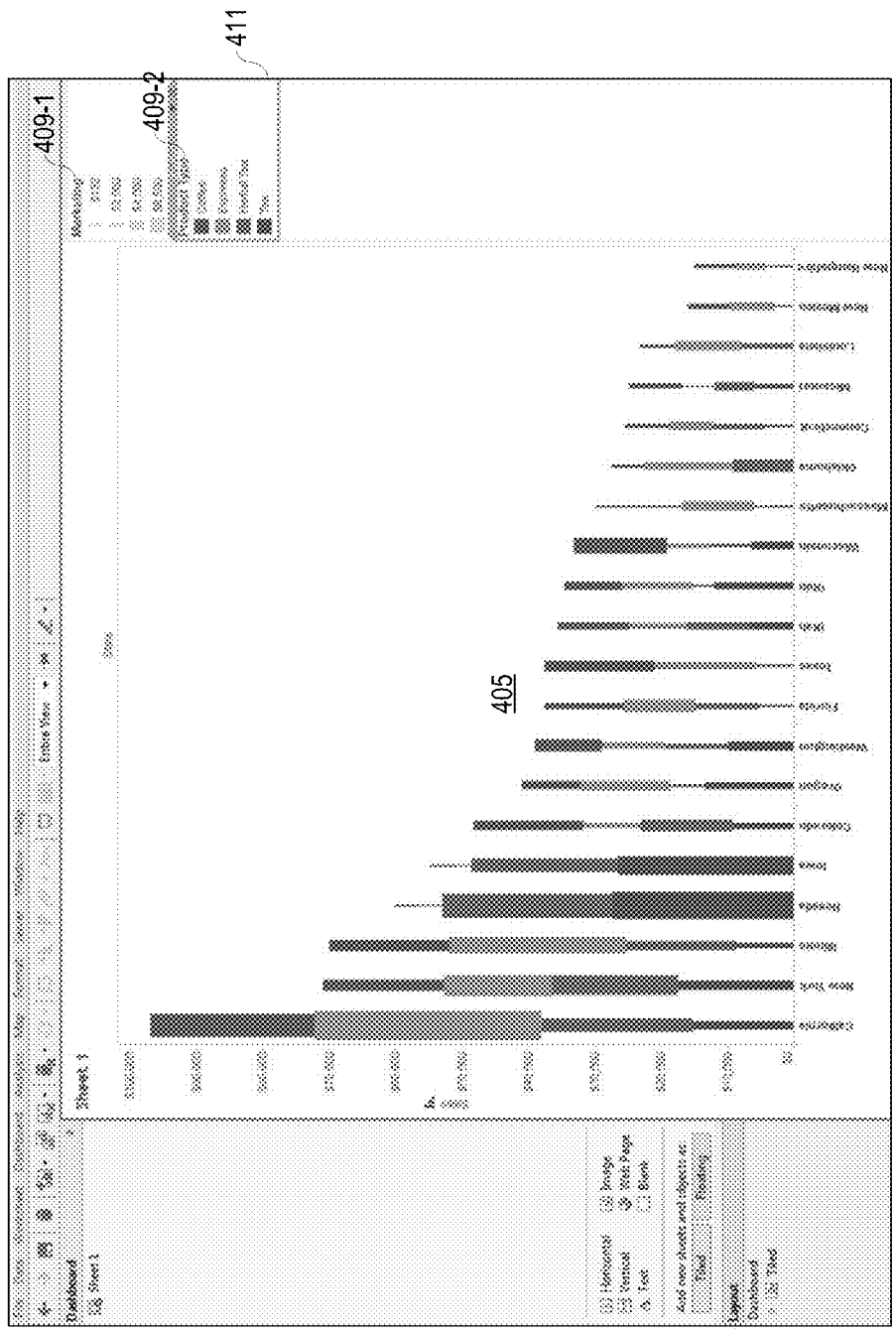

Since the dashboard 411 has merely three objects, each of the three objects has a reasonable size on the dashboard. But this would not be the case for a more real-life dashboard that has many more objects (e.g., 10 or more). On the other hand, the bar chart 405 has a significant amount of empty space 413 that displays no information. In order to better utilize the empty space 413, it is desirable for the user to move some of the objects into the empty space 413. To do so, the user can issue a first user instruction to the computer. In response to detecting (203) the first user instruction, the computer switches (205) the rendition of at least one of the objects from the tiled manner to a floating manner. FIG. 4C is an exemplary screenshot of the dashboard 411 after the object corresponding to the product type label 409-2 has been selected but before it is transitioned from the tiled manner to the floating manner. Note that the object now has a slightly different look-and-feel when compared with the object corresponding to the marketing expense label 409-1, which is still displayed in the tiled manner. In some implementations, the computer further moves the user-selected object by a few pixels in one or both directions to indicate that the object is now in floating manner.

Figure 4D:
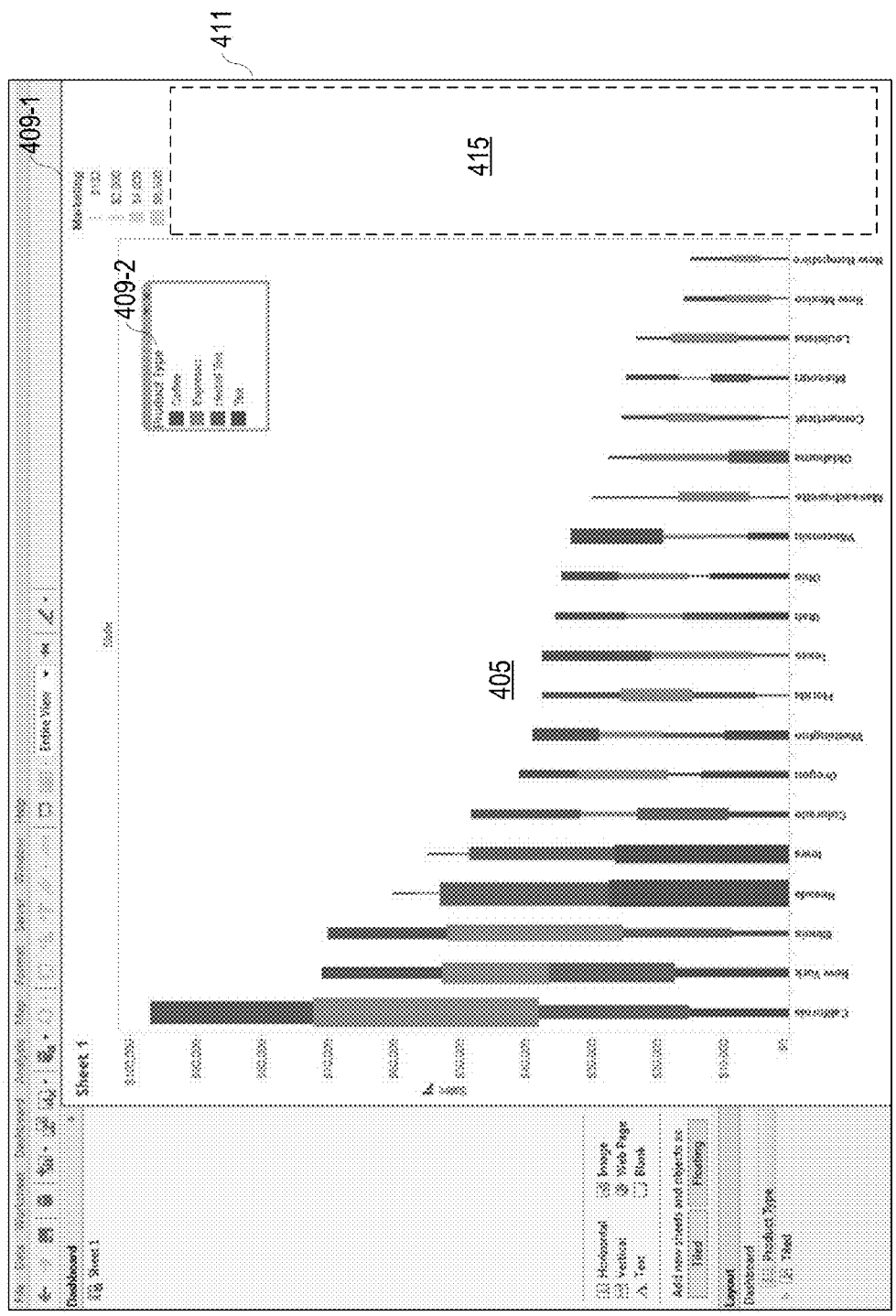

In response to detecting (207) a second user instruction from the user, the computer moves (209) a first object to a location determined by the second user instruction on top of a second object such that at least a portion of the second object is covered by the first object. FIG. 4D is an exemplary screenshot of the dashboard 411 after the user drags and drops the object corresponding to the product type label 409-2 from its original location below the object corresponding to the marketing expense label 409-1 to a new location in the empty space of the bar chart 405. Note that the removal of the object corresponding to the product type label 409-2 leaves more empty space 415 below the object corresponding to the marketing expense label 409-1. In some implementations, the movement of one object triggers the computer to adjust the sizes of the other objects to fill the space left by the object. But in this example, the computer cannot adjust the size of the bar chart 405 because of the existence of the object corresponding to the marketing expense label 409-1.

Figure 4E:
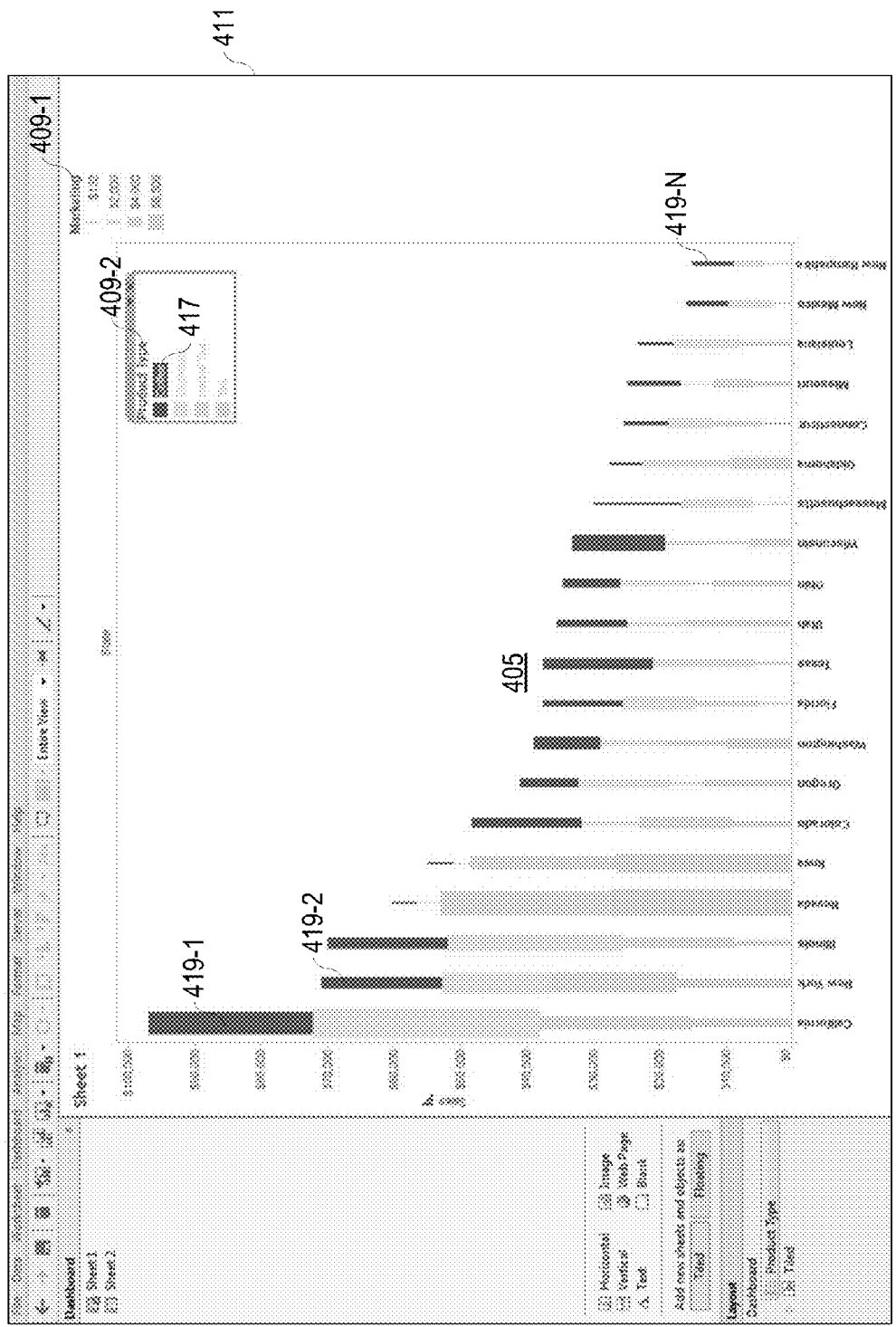

Since the different objects on the dashboard are associated with the same dataset, the user can change one object by altering another object. So in response to detecting (211) a third user instruction, the computer updates (213) both the first object and the second object. FIG. 4E is an exemplary screenshot of the dashboard 411 after the user selects coffee 417 in the product type label 409-2. In response to the user selection of coffee 417, the other three product types are grayed out in the product type label 409-2. Moreover, the bar chart 405 is updated accordingly such that the segments corresponding to the other three product types within the bar chart 405 are also grayed out and only the segments (419-1, 419-2, ..., 419-N) corresponding to the coffee 417 keep the same color. This example indicates that the different objects on the dashboard are not static images and they are related with one another through the underlying dataset with which these objects are associated.

Figure 3A:
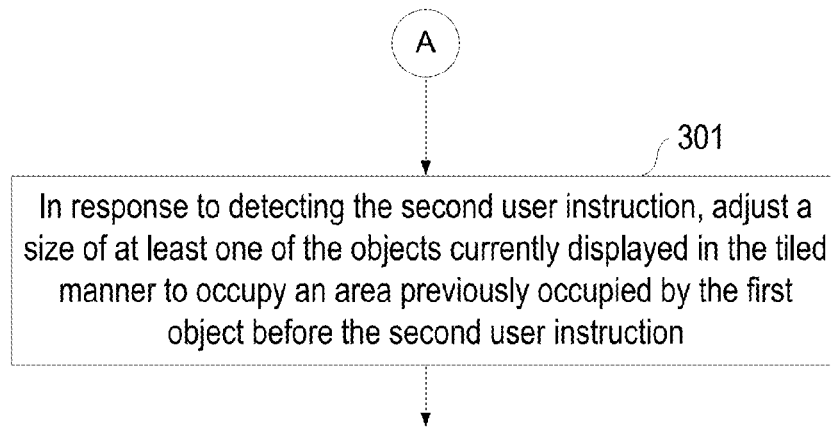
FIGS. 3A to 3D are flow charts illustrating sub-processes of updating the dashboard through user interactions with a graphical user interface according to some implementations of the present application.
Figure 4F:
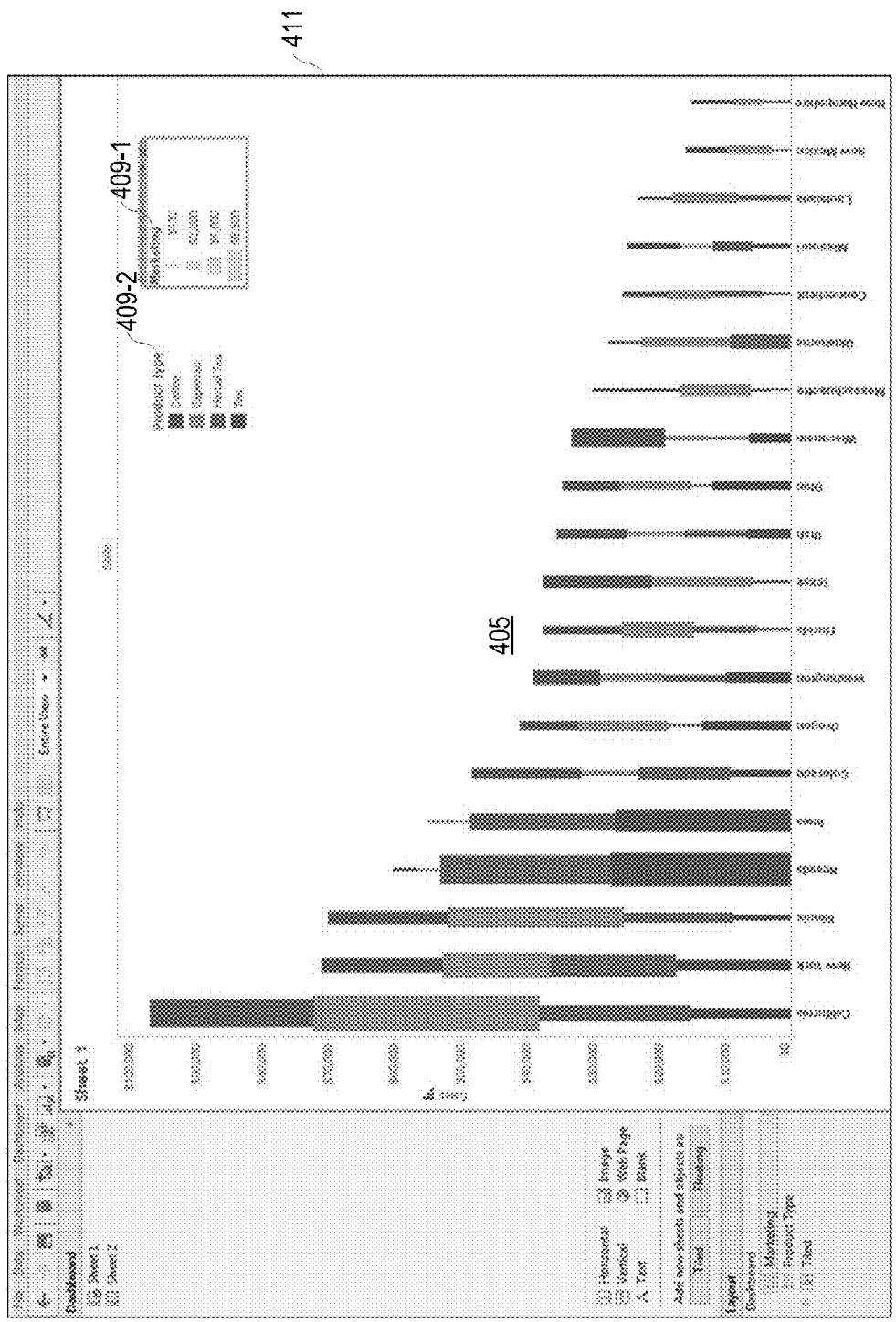

In some implementations, the movement of one object on the dashboard may cause the adjustment of another object or objects, which are displayed in the tiled manner, to maximize the usage of the space on the dashboard. FIG. 3A is a flow chart illustrating a sub-process of updating the dashboard through user interactions with a graphical user interface according to some implementations of the present application. In response to detecting the second user instruction, the computer adjusts (301) a size of at least one of the objects currently displayed in the tiled manner to occupy an area previously occupied by the first object before the second user instruction. FIG. 4F is an exemplary screenshot of the dashboard 411 after the user switches the rendition of the object corresponding to marketing expense label 409-1 from the tiled manner to the floating manner and moves the object on top of the bar chart 405. As a result of this object movement, there is no object to the right of the bar chart 405. The computer updates the dashboard by increasing the size of the bar chart 405 to occupy the empty space used to be occupied by the two objects. This feature is useful if the dashboard includes too many objects displayed in the tiled manner such that there is limited space for the primary object (e.g., the bar chart 405).

Figure 3B:
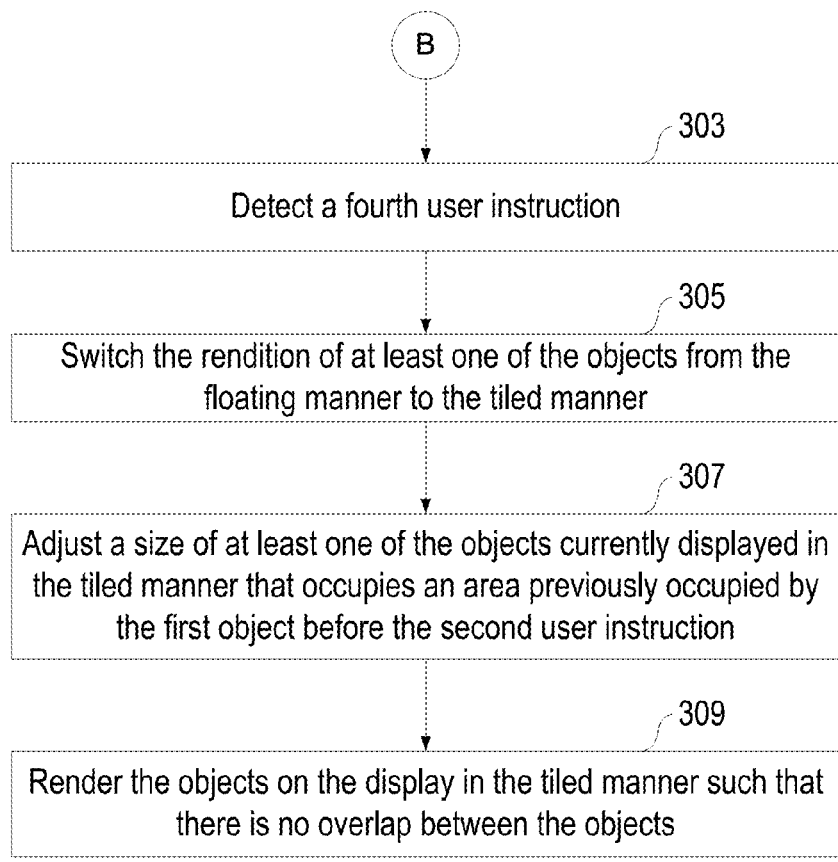
Figure 4G:
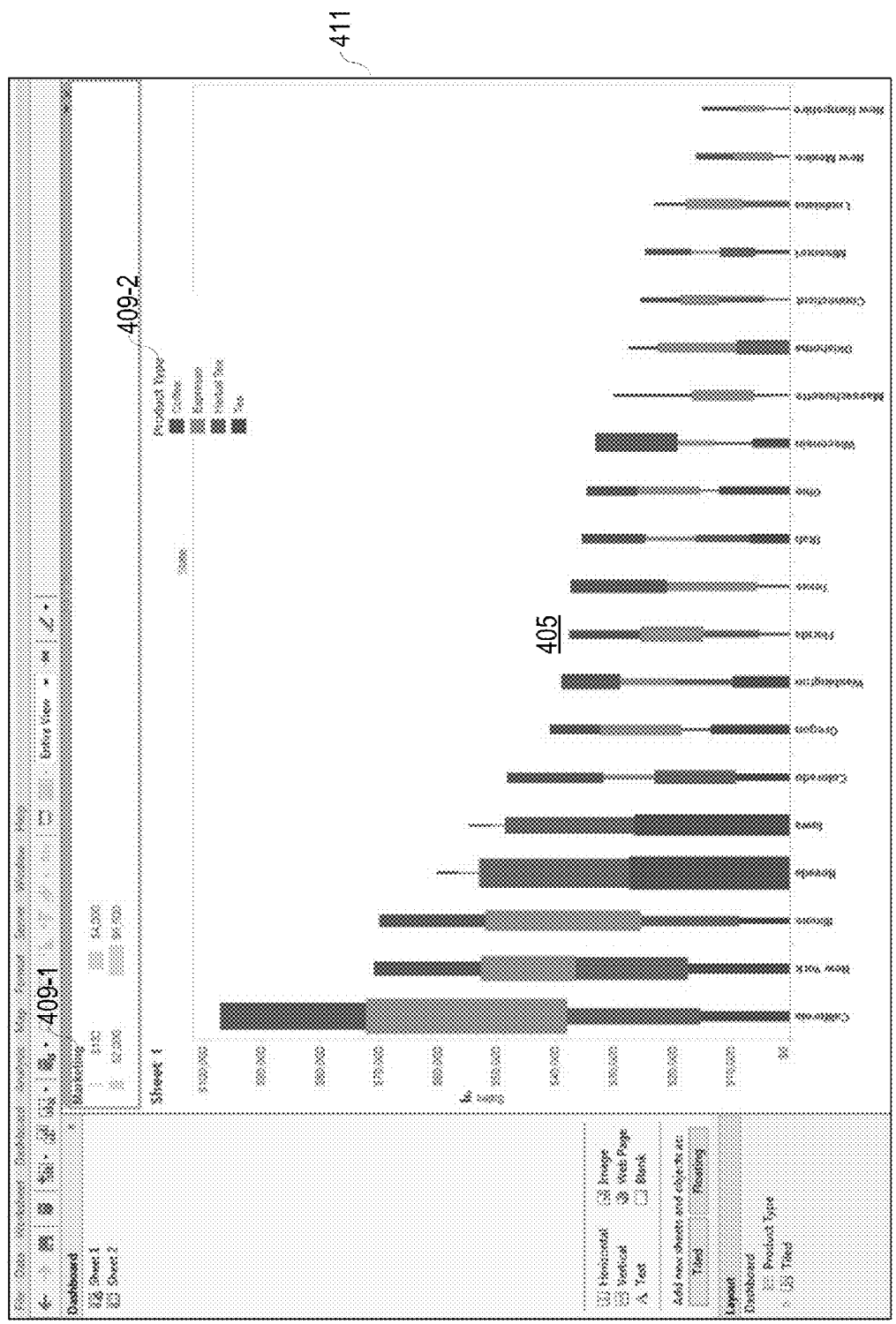

In some implementations, the change of display manner for a particular object on the dashboard is bidirectional. A user can change the rendition of an object from the tiled manner to the floating manner (as shown in FIG. 4D) or from the floating manner to the tiled manner. FIG. 3B is a flow chart illustrating a sub-process of switching the display manner of an object and updating the dashboard accordingly through user interactions with a graphical user interface according to some implementations of the present application. In response to detecting (303) a fourth user instruction, the computer switches (305) the rendition of at least one of the objects from the floating manner to the tiled manner. If the object was sitting on top of another object, the computer needs to choose a new location for the object so that it does not overlap with the other objects, which may involve a change of the size of another object currently displayed in the tiled manner on the dashboard. Therefore, the computer adjusts (307) a size of at least one of the objects currently displayed in the tiled manner. For example, the object to be adjusted is the one that occupies an area previously occupied by the first object before the second user instruction. The computer then renders (309) the at least one of the objects on the display in the tiled manner such that there is no overlap between the objects. In some implementations, in response to detecting the fourth user instruction, the computer may either move the first object back to the area previously occupied by the first object before the second user instruction. For example, the object corresponding to the product type label 409-2 may be moved back to the same location shown in FIG. 4B. In some other implementations, in response to detecting the fourth user instruction, the computer moves the first object to an area that is not the same as the area previously occupied by the first object before the second user instruction. FIG. 4G is an exemplary screenshot of the dashboard 411 after the user switches the rendition of the object corresponding to marketing expense label 409-1 from the floating manner to the tiled manner. Rather than returning to the same location shown in FIG. 4B, the object corresponding to marketing expense label 409-1 is rendered in the tiled manner at the top of the dashboard 411. Because the object corresponding to marketing expense label 409-1 cannot overlap with another object displayed in the tiled manner (e.g., the bar chart 405), the computer adjusts the size of the bar chart 405 to leave room for the object corresponding to marketing expense label 409-1. Note that objects displayed in the floating manner (e.g., the object corresponding to the product type label 409-2) are not affected by this process and they stay at the same locations on the dashboard.

Figure 3C:
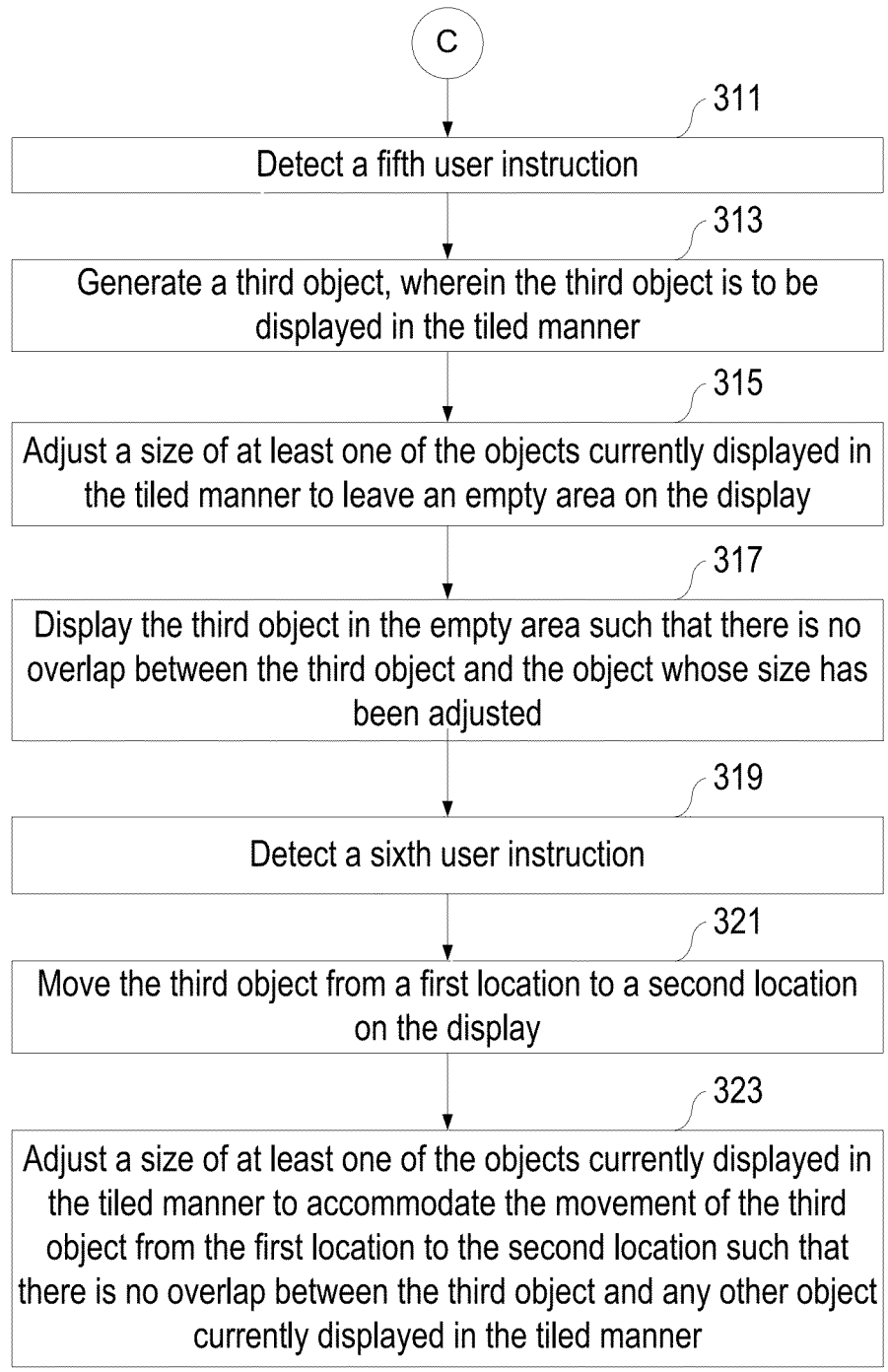
Figure 4H:
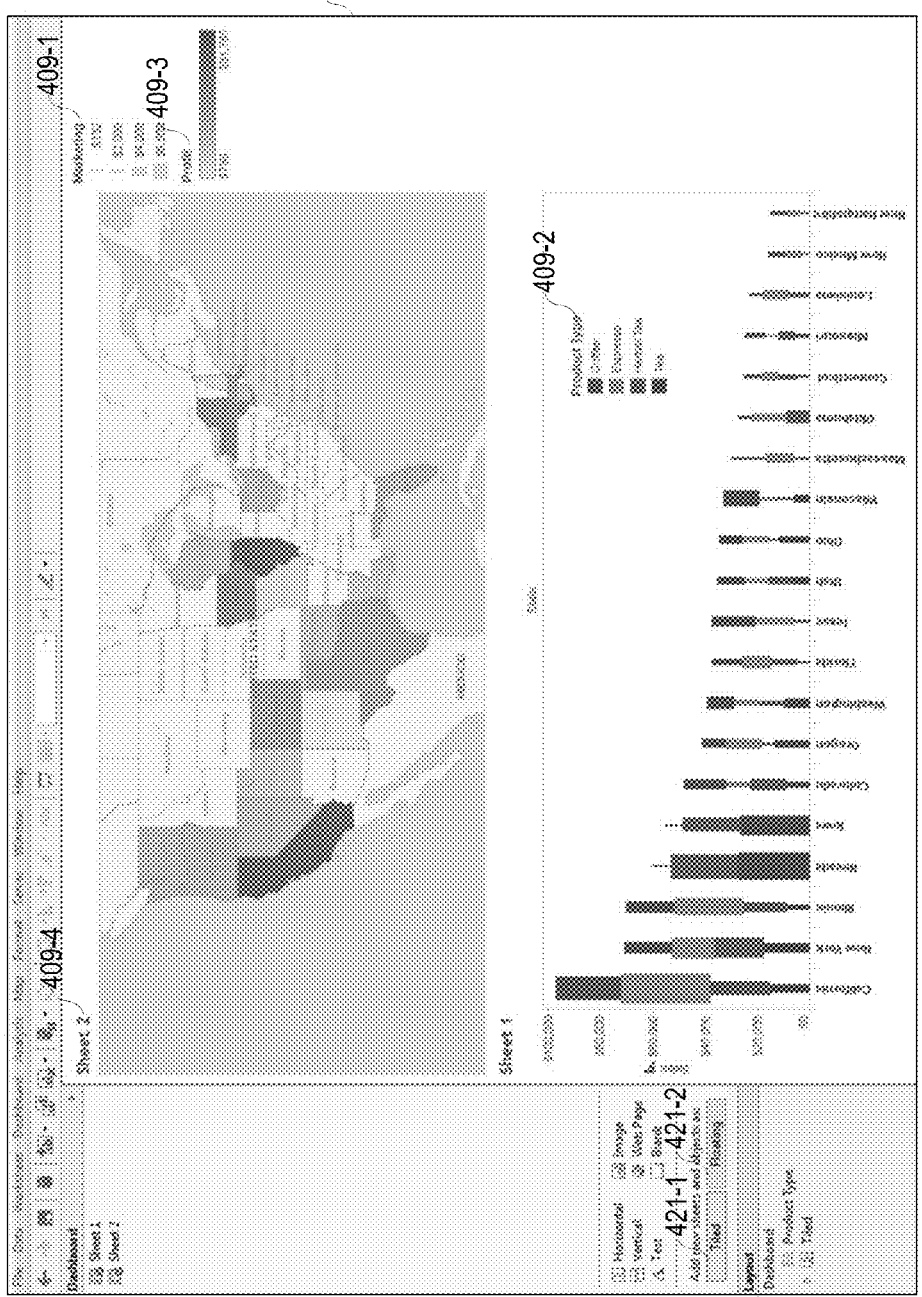

Besides moving existing objects on a dashboard, a user can also add new objects to the dashboard. FIG. 3C is a flow chart illustrating a sub-process of updating a dashboard by adding new objects to the dashboard through user interactions with a graphical user interface according to some implementations of the present application. In response to detecting (311) a fifth user instruction, the computer generates (313) a third object. In some implementations, the newly generated object is configured to be displayed in the tiled manner by default. For example, the object includes a display manner attribute, which is set to be "tiled" by default. Accordingly, the computer adjusts (315) a size of at least one of the objects currently displayed in the tiled manner to leave an empty area on the display for the third object and displays (317) the third object in the empty area such that there is no overlap between the third object and the object whose size has been adjusted. FIG. 4H is an exemplary screenshot of the dashboard 411 after the user generates two new objects in the same way as the ones shown in FIG. 4A and adds them to the dashboard 411. In this example, the two newly generated objects, a map view 409-4 and a color scale corresponding to the profit label 409-3, are related to each other because the colors on different states in the map view 409-4 represent the amount of profit that the company makes from that state during the predefined time period. As shown in FIG. 4H, the dashboard 411 includes a pair of display manner buttons, "Tiled" 421-1 and "Floating" 421-2, with "Tiled" being the default display manner. Therefore, both the map view 409-4 and the color scale corresponding to the profit label 409-3 are displayed on the dashboard in the tiled manner.

Figure 4I:
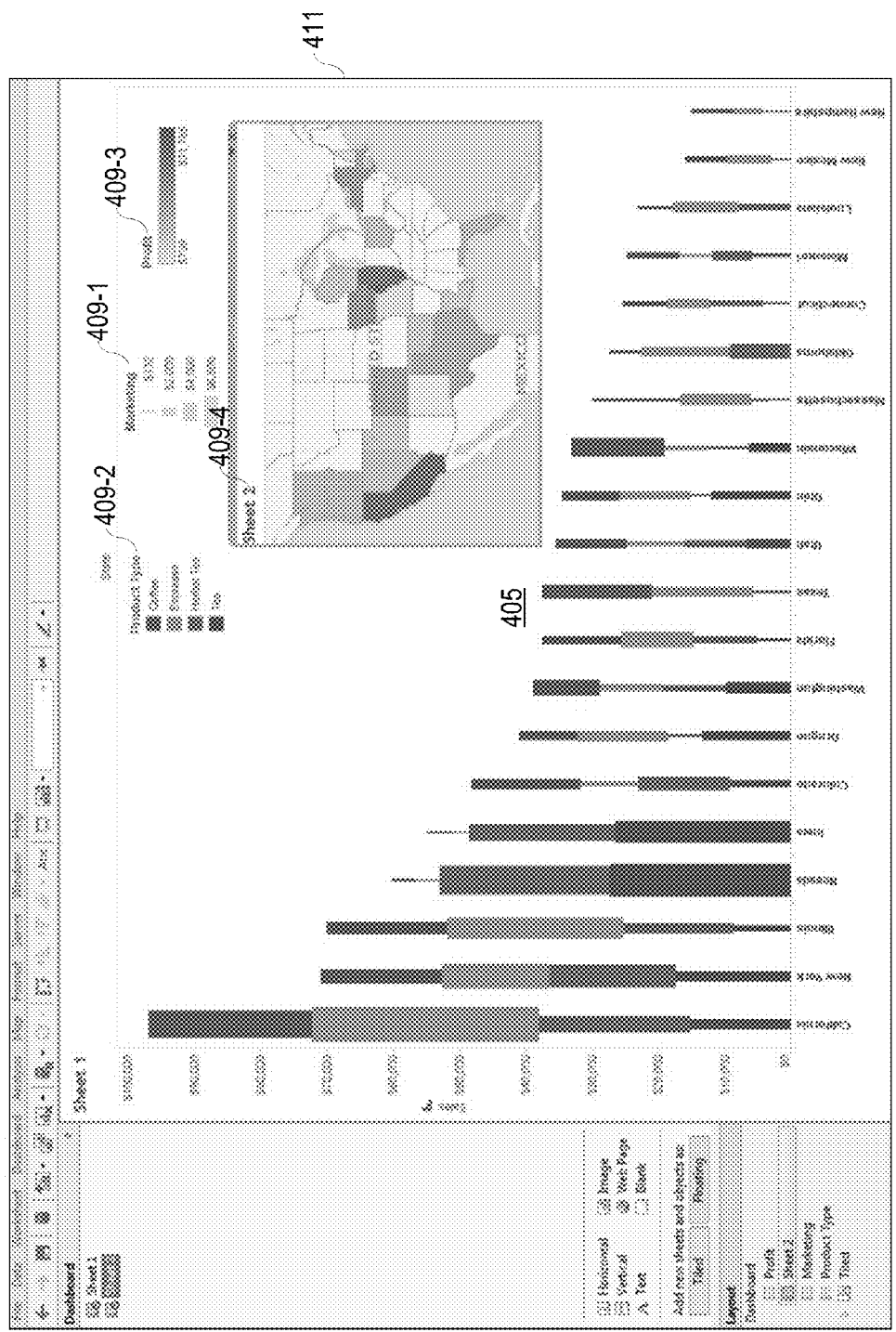
Figure 4J:
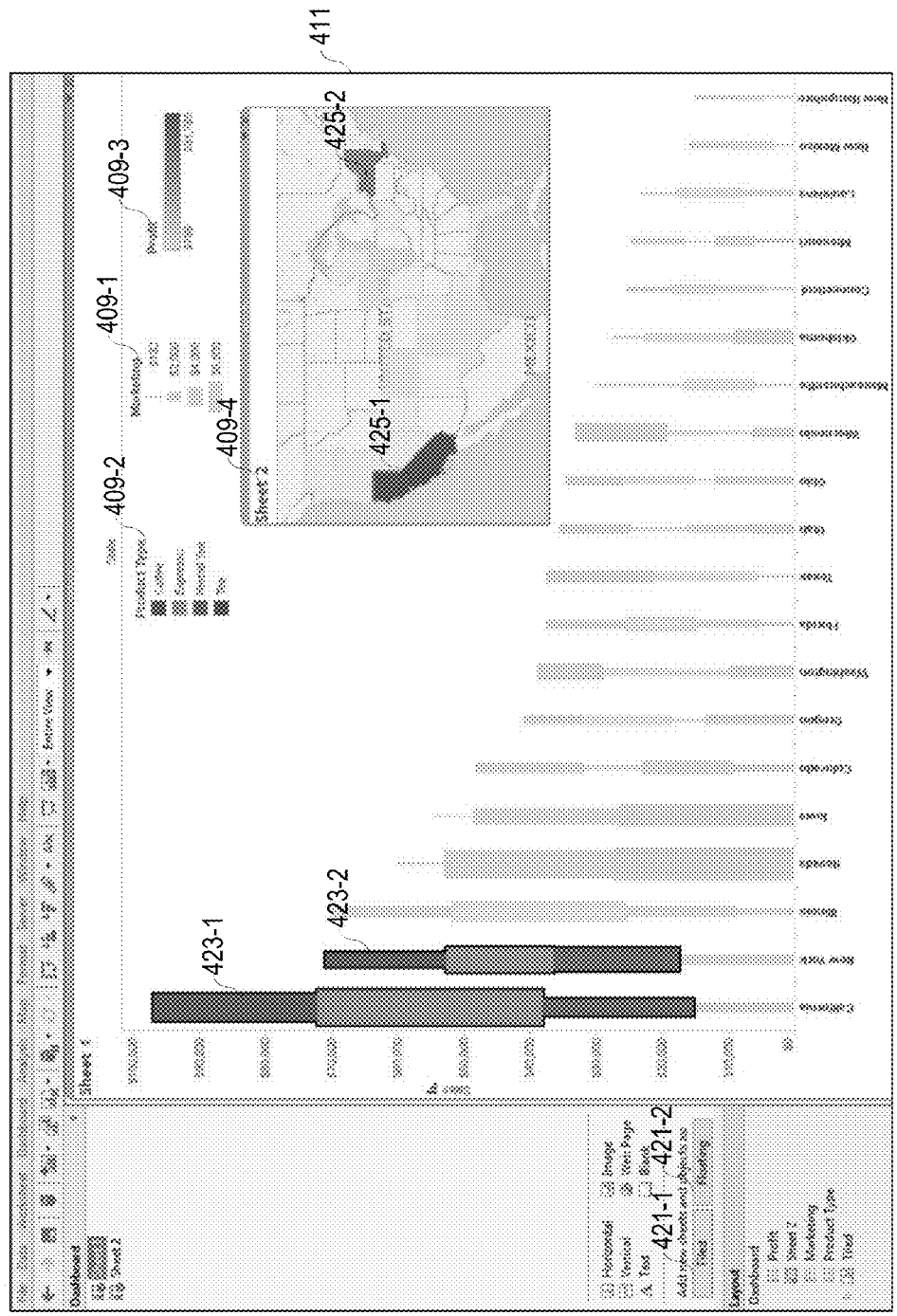

Like the examples described above, the user can issue instructions to change the display manner of the newly generated object from the tiled manner to the floating manner or vice versa and then move the object to a new location. Assuming that both the map view 409-4 and the color scale corresponding to the profit label 409-3 have changed from the tiled manner to the floating manner, in response to detecting (319) a sixth user instruction, the computer moves (321) the third object from a first location to a second location on the display and adjusts (323) a size of at least one of the objects currently displayed in the tiled manner to accommodate the movement of the third object from the first location to the second location such that there is no overlap between the third object and any other object currently displayed in the tiled manner. FIG. 4I is an exemplary screenshot of the dashboard 411 after the user moves the two new objects on top of the bar chart 405. In this example, the computer increases the size of the bar chart 405 to occupy the previously-occupied by the map view 409-4 and the other objects. In some implementations, an object (e.g., the map view 409-4) has a default size and/or location, which may be a function of the object type and its content as well as the dashboard and screen size. Each object type may have a different preferred size based on its content. For example, scalable objects (e.g. image) is scaled down based on the screen and dashboard sizes (e.g. ⅓ of the dashboard size) while other objects (e.g. legends, filters, text, etc.) is given a size to fit their content appropriately independent of dashboard or screen size. After the computer resets such objects to their default sizes and locations, a user can then update the objects by moving them from their current locations to new ones and changing their sizes as well. In some other implementations, the computer detects the empty space on the dashboard (e.g., the empty space 413 above the bar chart 405) and automatically chooses a size and location for each object. By doing so, the computer improves the usage of the space of the dashboard. Like the example shown in FIG. 4E, the newly generated object, e.g., the map view 409-4, is related to the bar chart 405. FIG. 4J is an exemplary screenshot of the dashboard 411 after the user selects the two bars in the bar chart 405. In response to the user selection of the two bars (423-1, 423-2), the other bars not selected by the user are grayed out. Moreover, the map view 409-4 is also updated to highlight only California 425-1 and New York 425-2 while graying out the other states in the map view 409-4 so as to be consistent with the updated bar chart 405.

Figure 3D:
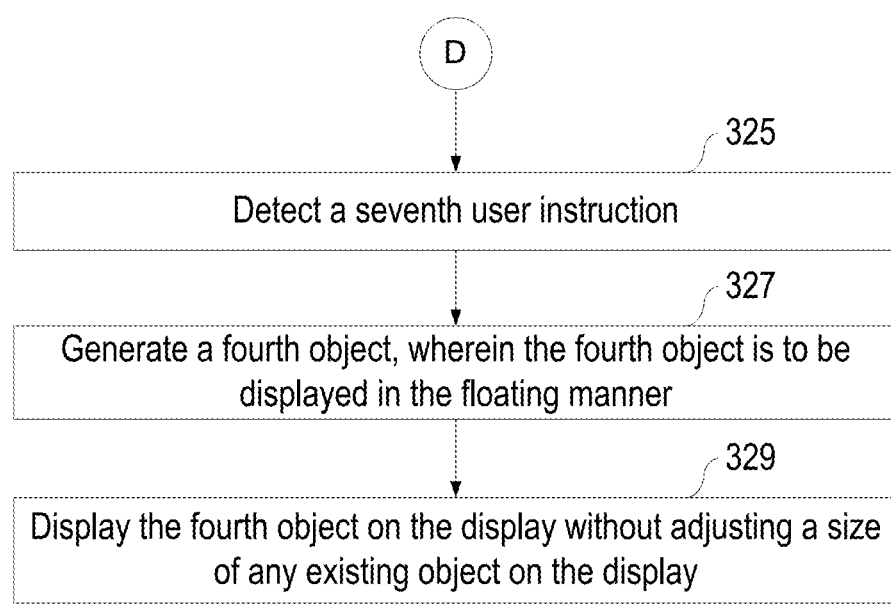

In some implementations, a user can select the "Floating" button 421-2 before adding a new object to the dashboard. FIG. 3D is a flow chart illustrating a sub-process of adding new objects to the dashboard and displaying them in the floating manner through user interactions with a graphical user interface according to some implementations of the present application. Assuming that the user has switched the display manner from "Tiled" to "Floating" for new objects, in response to detecting (325) a seventh user instruction, the computer generates (327) a fourth object and displays (329) the fourth object on the display in the floating manner. In this case, the computer does not adjust a size of any existing object on the display. Since the user has not specified a location for the fourth object, the computer may place it at a default location (e.g., the center or one of the four corners of the dashboard). Alternatively, the fourth object is staggered along with other objects near the default location (e.g., the upper left corner). The user can then manually move the object to a new location (e.g., the empty space above the bar chart).

Figure 5B:
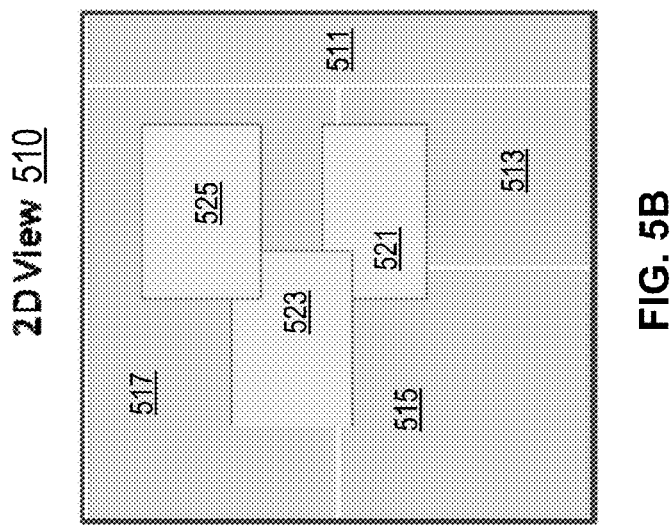
FIG. 5B is a 2D view of the floating objects projected onto the dashboard container according to some implementations of the present application.
Figure 5A:
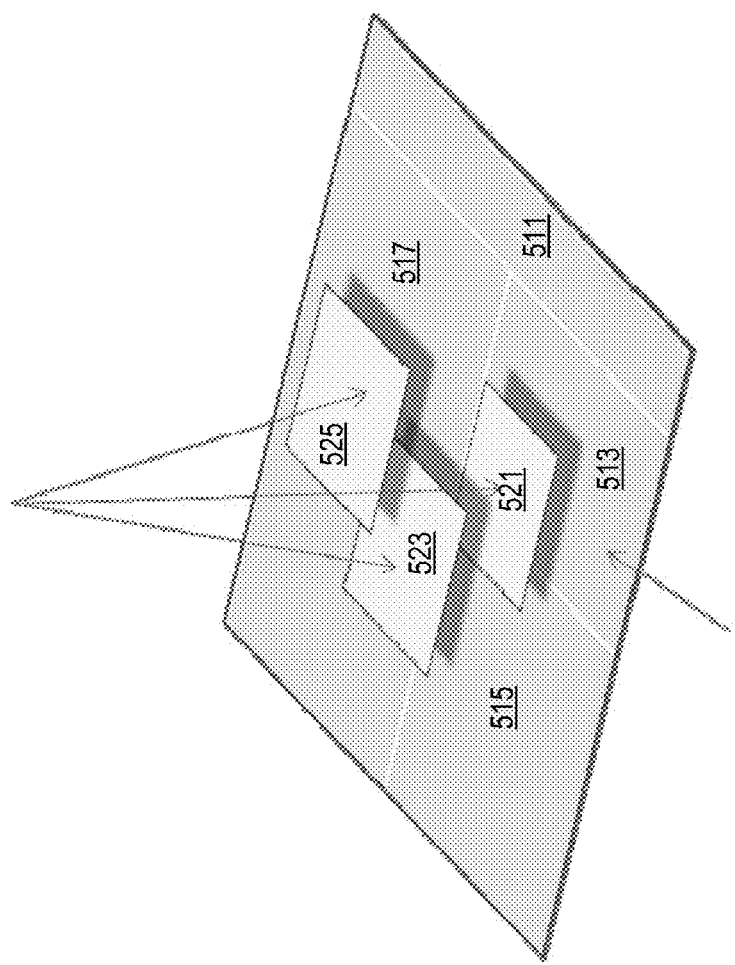
FIG. 5A is a 3D view of floating objects on top of a dashboard container according to some implementations of the present application.

The description above in connection with FIGS. 4A through 4J illustrates how a user moves floating objects within a dashboard (also referred to as a "dashboard container"). The following description discusses the mechanism behind moving the objects around within the dashboard container. FIG. 5A is a 3D view of floating objects on top of a dashboard container according to some implementations of the present application. In this example, the dashboard container 500 includes a set of constrained layout zones. The contained layout zones divided the dashboard container into multiple non-overlapping regions 511 to 517, each region including one or more objects as shown in FIGS. 4A and 4B. To support floating objects, the dashboard container defines a z-axis that is perpendicular to the surface of the dashboard container and assigns a z-coordinate to each floating object. As shown in FIG. 5A, the dashboard container 500 includes three floating objects (also referred to as "floating zones") 521 to 525. The three floating objects have a well-defined default z-order. In some implementations, the z-order of the floating objects is based on their respective object types. For example, the computer may apply a set of heuristic rules to determining the z-order of the floating objects.

By assigning each floating object a z-coordinate, it is possible for one object to overlap with another object in accordance with their respective z-coordinates. In this case, the floating object 525 is above the floating object 523, which, in turn, is above the floating object 521. FIG. 5A is a 2D view of the floating objects projected onto the dashboard container according to some implementations of the present application. Note that the floating object 525 covers the top right corner of the floating object 523 and the floating object 523 covers the top left corner of the floating object 521. The three floating objects collectively cover a portion of the dashboard container including the regions 513, 515, and 517.

When a user moves a floating object from one location to another location, the floating object's z-coordinate remains the same. In other words, the z-order of the floating objects on top of the dashboard container is not affected by the movement of the object. Sometimes, a user needs to change the z-order of the floating objects, e.g., to reveal a portion of a floating object (e.g., the top left corner of the floating object 521) that is covered by another floating object (e.g., the floating object 523). In some implementations, the computer generates a list widget for the floating objects in accordance with their z-coordinates and displays the list widget next to the dashboard container. The list widget includes one icon for each floating object and orders the icons by the z-order of the floating objects. A user can navigate the icons in the list widget, including moving one icon up/down the list, so as to update the z-order of the floating objects. In addition, the user can also drag and drop a new icon corresponding to a particular floating object into the list widget. Alternatively, the user can also remove an icon from the list widget, which results in a removal of a floating object from the z-order. For example, the object may be put into a constrained zone in the dashboard container 500 (e.g., the zone from which the floating object initially comes from) or removed from the dashboard container 500 completely. In some implementations, the dashboard container includes a layout container that includes multiple objects. Like the other objects in the dashboard container, the layout container can be displayed in the floating manner or tiled manner. In this case, the layout container and the objects inside the layout container have the same z-coordinate such that the objects move together with the layout container to overlap with another object in the dashboard container. Meanwhile, the layout container can be viewed as a dashboard container within its own world. For example, there is a z-order for the objects inside the layout container if the objects are displayed in the floating manner such that one object may overlap with another object in the layout container. The objects inside the layout container can also be displayed in the tiled manner such that there is no overlapping between two objects in the layout container.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method of visualizing a dataset, comprising:
   at a computer having memory, one or more processors, and a display:
      rendering multiple objects on the display according to respective display manner attributes corresponding to each of the multiple objects, displaying the multiple objects with no overlap in accordance with a tiled manner setting of the display manner attributes for each of the multiple objects, wherein each object is a data visualization that includes visual data marks corresponding to tuples of a respective set of fields retrieved from the dataset;
      detecting empty space within a first object of the multiple objects, wherein the empty space contains none of the visual data marks of the first object corresponding to retrieved tuples;
      automatically determining a size and a location of a second object in accordance with the empty space within the first object;
      switching the display manner attribute of the second object from the tiled manner to a floating manner and then displaying the second object on top of the empty space within the first object at the determined size and location; and
      in response to detecting user interaction with one or more visual data marks of one of the first object and the second object, updating display of the one object and concurrently updating corresponding visual attributes of the other one of the first and second objects based on the user interaction with the one or more visual data marks.

2. The method of claim 1, wherein, prior to displaying the second object on top of the empty space within the first object, the second object occupies a first area, and the method further comprises:
   adjusting a size of the first object to occupy the first area previously occupied by the second object.

3. The method of claim 1, wherein the second object has a first visual shape before being displayed on top of the empty space within the first object and a second visual shape after being displayed on top of the empty space within the first object.

4. The method of claim 3, wherein the second object in the first visual shape is larger than the second object in the second visual shape.

5. The method of claim 3, wherein the second object in the first visual shape includes a list of data samples and a scroll bar and the second object in the second visual shape is a dropdown list of the data samples.

6. A computer system for visualizing a dataset, comprising:
   one or more processors;
   a display; and
   memory storing one or more programs, wherein the one or more programs are configured to, when executed by the one or more processors, cause the one or more processors to:
      render multiple objects on the display according to respective display manner attributes corresponding to each of the multiple objects, displaying the multiple objects with no overlap in accordance with a tiled manner setting of the display manner attributes for each of the multiple objects, wherein each object is a data visualization that includes visual data marks corresponding to tuples of a respective set of fields retrieved from the dataset;
      detect empty space within a first object of the multiple objects, wherein the empty space contains none of the visual data marks of the first object corresponding to retrieved tuples;
      automatically determine a size and a location of a second object in accordance with the empty space within the first object;
      switch the display manner attribute of the second object from the tiled manner to a floating manner and then display the second object on top of the empty space within the first object at the determined size and location; and
      in response to detecting user interaction with one or more visual data marks of one of the first object and the second object, update display of the one object and concurrently update corresponding visual attributes of the other one of the first and second objects based on the user interaction with the one or more visual data marks.

7. The computer system of claim 6, wherein, prior to displaying the second object on top of the empty space within the first object, the second object occupies a first area, and the one or more programs further comprise instructions for:

adjusting a size of the first object to occupy the first area previously occupied by the second object.

8. A non-transitory computer readable storage medium storing one or more programs configured for execution by a computer system that includes one or more processors, a display, and memory storing one or more programs, the one or more programs comprising instructions for:

rendering multiple objects on the display according to respective display manner attributes corresponding to each of the multiple objects, displaying the multiple objects with no overlap in accordance with a tiled manner setting of the display manner attributes for each of the multiple objects, wherein each object is a data visualization that includes visual data marks corresponding to tuples of a respective set of fields retrieved from the dataset;

detecting empty space within a first object of the multiple objects, wherein the empty space contains none of the visual data marks of the first object corresponding to retrieved tuples;

automatically determining a size and a location of a second object in accordance with the empty space within the first object;

switching the display manner attribute of the second object from the tiled manner to a floating manner and then displaying the second object on top of the empty space within the first object at the determined size and location;

in response to detecting user interaction with one or more visual data marks of the first object, updating display of the first object and concurrently updating corresponding visual attributes of the second object based on the user interaction with the one or more visual data marks of the first object; and in response to detecting user interaction with one or more visual data marks of the second object, updating display of the second object and concurrently updating corresponding visual attributes of the first object based on the user interaction with the one or more visual data marks of the second object.

9. The non-transitory computer readable storage medium of claim 8, wherein, prior to displaying the second object on top of the empty space within the first object, the second object occupies a first area, and wherein the one or more programs further comprise instructions for:

adjusting a size of the first object to occupy the first area previously occupied by the second object.

* * * * *